United States Patent Office 2,700,185
Patented Jan. 25, 1955

2,700,185

THERMOPLASTIC CASTING COMPOSITIONS

Max M. Lee, Washington, D. C., assignor to the United States of America as represented by the Secretary of the Army No Drawing. Application July 17, 1951,
Serial No. 237,277

6 Claims. (Cl. 18—59)

(Granted under Title 35, U. S. Code (1952), sec. 266)

The invention described herein may be manufactured and used by or for the Government for governmental purposes without payment to me of any royalty thereon.

This invention relates to artificial thermoplastic casting resins especially suitable as electrical insulating and potting materials for use in high and ultra-high frequency circuits.

The primary object of the invention is provision of a thermoplastic material of such properties that it will serve as an insulating and potting composition at high frequencies. Properties of major importance in this connection are stability, tensile strength, hardness, impact strength, dissipation factor and dielectric constant. The dissipation factor is important because dielectric losses must be kept to a minimum. In like manner absorption of water is important because water, if absorbed, increases the losses due to the material. A second object of the invention is consequently the provision of a thermoplastic which will serve as a low loss potting and insulating composition at high frequencies without undue absorption of water.

Since the composition of this invention is to be used as a potting compound, it should originally be preferably in the liquid state for ease in handling. Consequently a third object is provision of a liquid, pourable polymerizable material which when properly cured in the presence of activating agents will convert to a tough rigid thermoplastic material that will serve as an insulating and potting composition suitable for use at high frequencies.

In previous researches, a plastic of desirable properties was developed, based upon 2,5-dichlorostyrene and described in an article by P. J. Franklin and M. Weinberg published in Plastics, July 1947, pages 57–59 and 71. Unfortunately 2,5-dichlorostyrene is a relatively expensive compound sometimes rather difficult to procure. Furthermore the potting composition based upon the dichloro compound is unstable in the liquid unpolymerized state in which it is normally stored and must be kept under refrigeration. A fourth object of my invention is therefore provision of a thermoplastic potting material which can be produced cheaply and stored in the liquid state without refrigeration. Other objects of the invention will appear hereinafter.

The essential ingredients of my invention are combinations of polymerizable monomers such as styrene, acrylonitrile and divinylbenzene, soluble polymers such as polystyrene, polybutadiene, styrenebutadiene copolymers, and polyisobutylene and miscible plasticizers such as the hydrogenated terphenyls or alkylnaphthalenes which may be added to improve certain physical properties of the cured casting resin.

These ingredients consist of an organic polymer or combination of polymers dissolved in a combination of polymerizable monomers. Plasticizers, which are miscible with the polymers and monomers can be added to improve impact resistance and low-temperature characteristics of the cured polymer. The monomers are preferably styrene and acrylonitrile although other polymerizable material may be used such as divinylbenzene, 2,5-dichlorostyrene, the low-molecular weight polybutadiene resins or the unsaturated glycol-maleate polyester resins. The acrylonitrile, $CH_2=CHCN$, is a colorless liquid soluble in most common solvents. It is substituted in this application for the expensive 2,5-dichlorostyrene monomer and tends to activate polymerization of the styrene. Divinylbenzene is a liquid used as a cross linking agent.

Polystyrene is the polymer that is usually preferred although such polymers as polybutadiene, styrene-butadiene copolymer, polyisobutylene or a combination of these polymers may be used with the polystyrene in the casting resin composition. All of these polymers possess excellent electrical properties and are used to give body to the solution, decrease shrinkage during cure and improve the impact resistance of the cured polymer.

The hydrogenated terphenyls or the alkylated naphthalenes such as diamylnaphthalene are the preferred plasticizers although the low-molecular-weight liquid polyisobutylenes may be used with certain combinations of polymers and monomers so that complete homogeneity is obtained.

The weight percentage of the ingredients used may be varied within limits as will be expected by one skilled in the art. Generic limits of these percentages are given in the second column of Table I while a specific tested formulation is given in the third column.

Table I

| Ingredient | Percentage Limits | Tested Formulations, percent |
|---|---|---|
| Styrene Monomer | 30–60 | 50 |
| Acrylonitrile Monomer | 1–30 | 5 |
| Polystyrene | 20–35 | 30 |
| Divinylbenzene | 0.5–30 | 2 |
| Plasticizer | 0.0–15 | [1] 13 |

[1] (Hydrogenated terphenyls or alkylated naphthlenes.)

After removal of the polymerization inhibitors from the divinylbenzene and acrylonitrile monomers, the purified ingredients are weighed and added together in a large closed container. If any ingredient is solid it quickly dissolves in the liquid styrene and acrylonitrile present. The container is then rolled on a machine overnight or for about eight hours. Such rolling is necessary to prevent the formation of clumps or semi-agglomerates. After rolling the composition is a clear viscous liquid and will remain in that condition for at least seven months according to tests. Protection from sunlight and heat are necessary to preserve the clear liquid condition but refrigeration is not necessary unless storage for long periods is contemplated. Normal storage temperatures are otherwise quite acceptable to the liquid.

When it is desired to use the material a polymerization catalyst or promoter is added. If the liquid is to be utilized for potting, the catalyst and promoters are mixed, and the composition poured around the elements to be potted. As catalysts, suitable materials are 0.1–1.0% of an organic peroxide, such as benzoyl peroxide or cumene hydroperoxide. It is sometimes desirable to use heterocyclic amine promoters, to accelerate the polymerization reaction. About 0.01–0.3% of the amine is required. Various metallic driers, such as cobalt naphthenate, may be used in conjunction with the promoters and the peroxide catalysts.

After addition of the peroxide catalyst, the polymerization promoter, and the metallic drier, the resin mixture is cured for about 48 hours at 50° C. Satisfactory cure can be obtained in 24 hours but better results follow if the longer time is utilized.

The formulation shown in column 3 of Table I was catalyzed with benzoyl peroxide and n-B-hydroxyethyl-1, 2, 3, 4 tetrahydroquinoline and cured for 48 hours at 50° C. The result was a semi-transparent to opaque solid with a specific gravity of 1.06, a 9.8% volume shrinkage occurring during the curing time. Water absorption of the solid was low, 0.13 percent by weight in 24 hours. Some other properties of the cured resin are: (1) Heat distortion temperature, 51° C.; (2) hardness, M 80 (Rockwell); (3) tensile strength, 4,600 P. A. I., (4) compressive strength, 15,300 P. S. I.; (5) impact strength, 0.22 (Izod notched); (6) volume resistivity, $1.8 \times 10^{17}$ ohm-cm; (7) dielectric strength, 1300 volts per mil. The dielectric constant and the dissipation factor were measured over a range of frequencies with results given in Table II:

Table II

| Frequency (c./s.) | Dielectric Constant | Dissipation Factor |
|---|---|---|
| $10^2$ | 2.62 | |
| $10^3$ | 2.61 | 0.12 |
| $10^4$ | 2.61 | 0.10 |
| $10^5$ | 2.61 | 0.09 |
| $10^6$ | 2.57 | 0.09 |
| $3 \times 10^6$ | 2.55 | 0.09 |
| $8.6 \times 10^9$ | 2.56 | 0.13 |

While the properties have been carefully tabulated for one formulation, others are completely satisfactory. The best dielectric properties are however obtained with compositions containing the lower concentrations of acrylonitrile. On the other hand, higher concentrations of the acrylonitrile form resins that, when catalyzed, cure to hard polymers overnight without application of external heat.

Other changes in the properties of the resin can be obtained by substituting divinylbenzene for some of the acrylonitrile and plasticizer holding the percentages of styrene monomer and polymer constant. Thus compositions containing 1–20% by weight of divinylbenzene, about 3.0% by weight of acrylonitrile and utilizing the lower percentages of plasticizer indicated in Table I, yield resins having higher distortion temperatures than the 51° C. given above. For some applications this higher percentage of divinylbenzene would therefore be desirable.

What is claimed is:

1. An electrical insulating and potting composition consisting by weight essentially of from 30–60% of styrene monomer, from 1–30% of acrylonitrile monomer, from 20–35% of polystyrene, from 0.5 to 30% of divinylbenzene, and not more than 15% of an alkylnaphthalene plasticizer.

2. A liquid polymerizable electrical insulating and potting composition consisting by weight essentially of from 30–60% of styrene monomer, from 1–30% of acrylonitrile monomer, from 20–35% of polystyrene, from 0.5–30% of divinylbenzene, not more than 15% of a plasticizer selected from the group consisting of hydrogenated terphenyl, alkyl naphthalenes and low molecular weight polyisobutylenes, said composition being activated by the addition of 0.1–1% of an organic peroxide catalyst to hasten the reaction time, 0.01–0.3% of a heterocyclic amine and a metallic naphthenate drier.

3. A liquid polymerizable electrical insulating and potting composition consisting by weight essentially of from 30–60% of styrene monomer, from 1–30% of acylonitrile monomer, from 20–35% of polystyrene, from 0.5 to 30% of divinylbenzene and not more than 15% of a plasticizer chosen from the group consisting of hydrogenated terphenyl, alkylnaphthalenes and low molecular weight polyisobutylenes, said composition being convertible to a rigid polymeric material when activated by a composition consisting of from 0.1% to .1% based on the total weight of benzoyl peroxide, 0.01–0.3% N-B-hydroxyethyltetrahydroquinoline and cobalt naphthenate.

4. An electrical insulating and potting composition comprising 30–60% of styrene monomer and 1–30% of acrylonitrile monomer; from 20–35% of a filling and shrinkage controlling material selected from the class consisting of polystyrene, polybutadiene, styrene-butadiene copolymers, and polyisobutylene; 0.5–30% of divinylbenzene as a cross-linking agent; not more than 15% of a miscible plasticizer selected from the group consisting of hydrogenated terphenyl, alkylnaphthalenes and low molecular weight polyisobutylenes; said composition being activated to form a rigid polymeric material by the addition of from 0.1% to 1% of an organic peroxide catalyst, 0.01–0.3% of a heterocyclic amine, and a metallic naphthenate drier.

5. An electrical insulating and potting composition comprising 1–30% of acrylonitrile monomer and 30–60% of styrene monomer; from 20–35% of a filling and shrinkage controlling material selected from the class consisting of polystyrene, polybutadiene, styrene-butadiene copolymers and polyisobutylene; 0.5 to 30% of divinylbenzene as a cross-linking agent; not more than 15% of a miscible plasticizer selected from the group consisting of hydrogenated terphenyl, alkylnaphthalenes, and low molecular weight of polyisobutylenes; said composition being activated to form a rigid polymeric material by the addition of about 0.1–1.0% of a catalyst selected from the group consisting of benzoyl peroxide and cumene hydroperoxide, about 0.01–0.3% based on the total weight of the compositions of N–B hydroxyethyl-1,2,3,4-tetrahydroquinoline and cobalt naphthenate as a drying agent.

6. The process of potting electrical circuit components which comprises pouring around said electrical circuit components, a mixture consisting by weight essentially 30–60% styrene monomer, 1–30% acrylonitrile, 0.5 to 30% divinylbenzene; not more than 15% of plasticizer selected from group consisting of hydrogenated terphenyl, alkylnaphthalenes and low molecular weight polyisobutylenes, 20–35% of a filling and shrinkage controlling material selected from the group consisting of polystyrene, polybutadiene, styrene-butadiene copolymers, and polyisobutylene, and a catalyst composition comprising from 0.1–1.0% of an organic peroxide based on the total weight of the total mixture and curing said mixture for a time sufficient to produce a rigid thermo-plastic composition.

References Cited in the file of this patent

UNITED STATES PATENTS

| | | |
|---|---|---|
| 2,102,179 | Hopff | Dec. 14, 1937 |
| 2,123,599 | Fikentscher et al. | July 12, 1938 |
| 2,310,961 | Kropa | Feb. 16, 1943 |
| 2,538,779 | Harrison et al. | Jan. 23, 1951 |
| 2,569,767 | Knock | Oct. 2, 1951 |
| 2,609,353 | Rubens et al. | Sept. 2, 1952 |
| 2,620,324 | Coover et al. | Dec. 2, 1952 |

FOREIGN PATENTS

| | | |
|---|---|---|
| 590,247 | Great Britain | July 11, 1947 |
| 593,072 | Great Britain | Oct. 8, 1947 |
| 890,289 | France | Nov. 2, 1943 |

OTHER REFERENCES

Franklin et al.: Plastics, July 1947, p. 57–59, 71.

Lewis et al.: Jour. Am. Chem. Soc., October 1945, vol 67, pp. 1701–5.